United States Patent [19]

Wilkens

[11] Patent Number: 4,743,472
[45] Date of Patent: May 10, 1988

[54] PROCESS FOR PRODUCTION OF FLAT MOLDING INSERTS SUCH AS GASKETS

[75] Inventor: Christian Wilkens, Heusenstam, Fed. Rep. of Germany

[73] Assignee: Karl Mayer Textilmaschinenfabrik GmbH, Obertshausen, Fed. Rep. of Germany

[21] Appl. No.: 777,518

[22] Filed: Sep. 19, 1985

[30] Foreign Application Priority Data

Oct. 10, 1984 [DE] Fed. Rep. of Germany ....... 3437087

[51] Int. Cl.⁴ .............................................. B05D 3/12
[52] U.S. Cl. ..................................... 427/292; 28/143; 427/289; 427/290
[58] Field of Search ....................... 427/289, 290, 293; 28/143; 277/228, 230

[56] References Cited

U.S. PATENT DOCUMENTS 3,320,083 5/1967 Rusch, Jr. ........................ 427/289 X
4,395,441 7/1983 Farnam ........................... 427/290 X Primary Examiner—Evan K. Lawrence
Attorney, Agent, or Firm—Omri M. Behr

[57] ABSTRACT

An article and process for the formation and molding of articles such as gaskets from useful areas of a flat textile panel. This panel is divisible into useful areas possessing textile reinforcement inlay threads in greater thickness and density than in the majority of the areas of the panel remaining outside the useful areas. The textile panel is produced from a ground pattern with the reinforcement threads inlaid thereinto. The useful areas are separated from the textile panel and embedding material is embedded onto the appropriate useful areas corresponding to the articles before or after the separation of the articles.

28 Claims, 3 Drawing Sheets

PROCESS FOR PRODUCTION OF FLAT MOLDING INSERTS SUCH AS GASKETS

BACKGROUND OF THE INVENTION

1. Field of the Invention

The present invention relates to a process for the formation of flat fabric for the molding of items such as gaskets which have a reinforcement inlay of textile. In such fabric a textile panel is produced from which the inlaid areas (corresponding to the desired items) are separated either before or after the provision of an embedding material (e.g. a material covering or saturating the inlays to achieve the desired properties of the finished product).

2. Discussion of the Relevant Art

Heretofore, it has been known to produce articles of the foregoing type from a woven fabric panel. This approach involves regularly laid weft and warp threads. The items in question are then stamped out of the textile pattern either before or after application of the embedding material. There is thus produced by this known method a very substantial waste of the panel material. The costs for the thread utilized in this waste must, of course, be taken into account in calculating the entire cost of the items. There is an additional problem in that the reinforcement threads utilized for the strenghtening inlays, depending on the ultimate use, must have certain mechanical, thermal, chemical, or other particular properties and the price would correspond thereto.

One of the objects of the present invention is to provide a process of the heretofore described type in which the amount of material and the cost is substantially reduced.

SUMMARY OF THE INVENTION

In accordance with the illustrative embodiments demonstrating principles, features and advantages of the present invention, there is provided a process for the formation and molding of articles such as gaskets from embedding material and a flat textile panel. The panel is divisible into useful areas corresponding to the articles and areas outside the useful areas. The method includes the step of locating the reinforcement threads in the areas corresponding to the useful areas, in greater thickness and density than in the majority of the areas of the panel remaining outside the useful areas. Another step is producing the textile panel from a ground pattern with the reinforcement threads inlaid thereinto. The method also includes the step of separating the useful areas from the textile panel and embedding the embedding material onto the appropriate useful areas corresponding to the articles before or after the separation of the articles.

By providing the foregoing method an improved gasket or other useful article is achieved. A fabric or textile panel is produced from a ground stitch pattern having reinforcement threads laid thereinto in such a manner that the reinforcement threads are present in the useful sectors in greater density. These useful areas of greater density correspond to areas where the inlays are placed with a greater density than in most of the remaining material, which lies outside the useful segment and is separated from the useful segments distinguished by the dense inlays. Under the term "density" there is included the total of reinforcement threads.

In this procedure, the reinforcing threads are substantially only used where they will later be needed, that is to say, in the useful sectors which will be cut out. Accordingly, the cost of reinforcement thread material is also substantially lower than before. The threads of the ground stitch pattern can be slightly or significantly less expensive than the material for the reinforcement threads.

Since the reinforcement threads are not laid-in in a regular manner, it is possible to provide, within the useful segment itself, zones of different density of reinforcement threads if it is desired to obtain, within the finished item, zones of different solidity.

A further cost saving is obtained by the fact that the reinforcement threads are not, as is the case in weaving, deformed into a sinuous shape, but rather can be laid into the ground stitch pattern in substantially straight form. In order to cover a predetermined surface with reinforcement threads therefore, a lesser length of reinforcement thread is required.

In a preferred modification of the invention the reinforcement threads are provided as fully running-through weft threads, partial weft threads, warp inlays or combinations thereof in order to provide useful sectors which have a greater thread density than the remaining areas. Full weft threads can, for example, be provided by the conventional magazine arrangement. Partial weft threads can be provided from guide bars. Warp inlay threads can be provided with simple thread guides. All of these arrangements are well known in warp knitting machines. It is thus possible to carry out the process of the present invention on entirely conventional warp knitting machines.

It will be noted, of course, that when both of the foregoing modes are utilized there is provided a crossing zone of very high thread density.

In a further embodiment of the invention, the reinforcement threads are laid in the form of a plurality of partial weft threads which complement each other in the wider sections (of larger width) of the useful sector; and weft thread segments are provided in the sectors of lesser width of the useful area. This is valuable for the formation of annular-shaped portions.

BRIEF DESCRIPTION OF THE DRAWINGS

In order that the invention may be more fully understood, the invention will now be described in greater detail with reference to the appended drawings showing the preferred embodiments of the invention; wherein.

DETAILED DESCRIPTION OF THE PREFERRED EMBODIMENT

The figures each illustrate a sector to be cut out of a fabric pattern. However, each have different laying patterns and reinforcement threads and different forms of the useful sectors.

Figure 1:
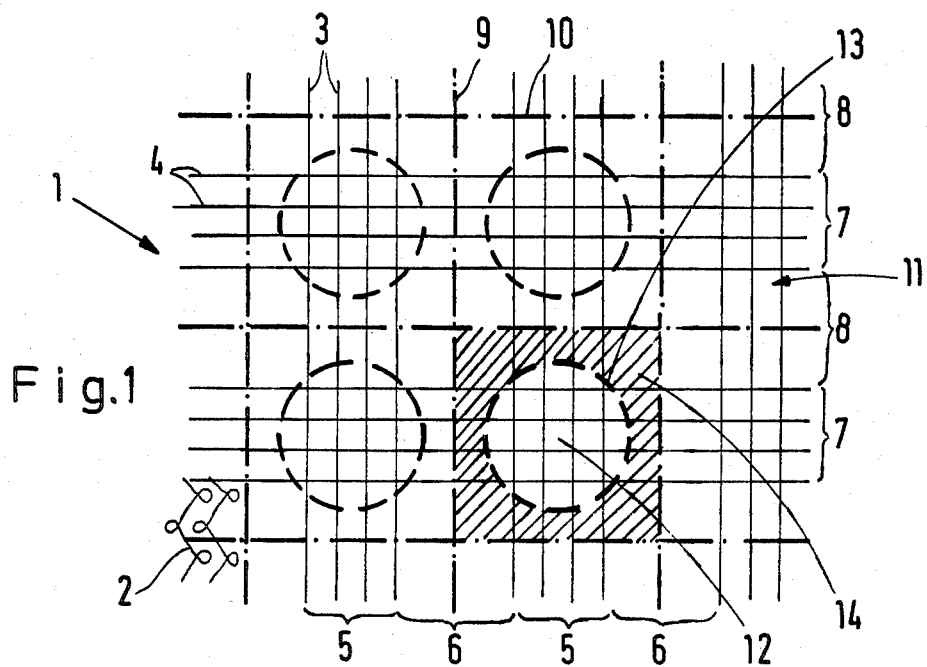
FIG. 1 is a plan view of a fabric having full, reinforcing, warp and weft threads, grouped to intersect at useful circular areas.

FIG. 1 illustrates a fabric panel 1 which shows a ground work pattern 2 indicated at the lower left as a tricot stitch. This tricot stitch may be provided by a conventional warp knitting machine having the usual guide bars needles etc (not shown). In this ground pattern there are provided warp threads 3 and full weft threads 4 which serve as reinforcement threads. These weft threads may be laid by the usual weft thread magazine (not shown) by transversely laying weft thread into the stitching area of the knitting machine just upstream of the needles. Subsequent formation of the tricot stitch captures the weft thread in the resulting fabric. These reinforcement threads 3, 4 do not have to contribute much to the solidity of the reinforcement inlay. In an extreme circumstance, the ground pattern only serves to hold the reinforcement threads in their predetermined position until the embedding material is applied thereto. Four warp threads 3 are provided adjacent to each other in sector 5 whereby the sector 6 is left free in the panel direction.

These reinforcing warp threads 3 are laid into the fabric in the usual fashion so that they are stitched into the fabric.

Four weft threads 4 are placed next to each other in sector 7 whereby the segment 8, running perpendicular to the panel direction, is left free. The interrupted pattern is achieved by, for example, threading less than all of the positions in the weft thread magazine.

As reinforcement thread materials, it is desirable to utilize technical threads such as carbon, glass, quartz, fluoro-containing polymers such as "TEFLON" (trademark) or particular purpose polyamides such as "KEVLAR" (trademark) or metallic threads such as steel, silver, or gold. Such technical threads and metallic threads are expensive and in some cases extraordinarily expensive. Thus, it is possible to provide substantial savings by the concentration of the reinforcement threads in the useful areas where they are required. It is further to be noted that the material utilized for the reinforcement threads, as opposed to the thread material used for the ground stitch pattern can be provided of more rigid and/or more breakable material. In this group there may be considered, for example, glass, quartz, or carbon threads. Such materials either cannot be woven or can only be woven with substantial difficulty since in the weaving process each single thread must be forced into a wave-like pattern. However, when such reinforcement threads are laid into the ground stitch pattern they may be provided in a substantially linear manner and thus the bending influence thereof is considerably reduced.

The orthogonal dotted lines 9 and 10 indicate the boundaries of each quadrant 11 within which the reinforcement threads show the same pattern. In each of these quadrants 11 there is provided one useful sector 12 in which the reinforcement threads 3 and 4 cross each other and therefore have a particularly high density. The cut to separate the strenghtened inlays will be led around the edge 13 of the useful sector.

The sectors lying outside the useful sector 12, namely area 14, is waste. This sector 14 comprises the inexpensive thread material of the ground stitch 2 and contains only the straight reinforcement thread portions 3, 4 which are necessary for the reinforcement threads (which are laid across the entire panel) to span across a plurality of neighboring useful sectors 12. The best results are obtained when the proportion of reinforcement thread in the remaining (to be discarded) sector is less than 10%, suitably 5%, of the total consumption of reinforcement thread material. This means that the reinforcement thread, during the transition from one useful sector to the adjacent useful sector is practically linear, that is to say, it is led either in the direction of the panel or perpendicular thereto.

The reinforced inlay, which is later formed by the cutting out, stamping out or using other separating means, along line dotted line 13, has the shape of the desired item; here a circular disk. While in an ordinary fabric pattern it does not matter at which point the reinforcement inlay corresponding to the molding item is separated out, in this case care must be taken that only the useful segment to be utilized as inlay is separated out. This can be done without causing any substantial difficulties. For example, in the cutting or stamping, the work tool must grasp the edge of the useful segment, a requirement which, in the automatic application of the process can be readily controlled by optical or other sensors. Another possibility exists therein in providing separating threads at the edge of the useful segment which can be dissolved either by chemical means or by the influence of elevated temperatures.

Figure 2:
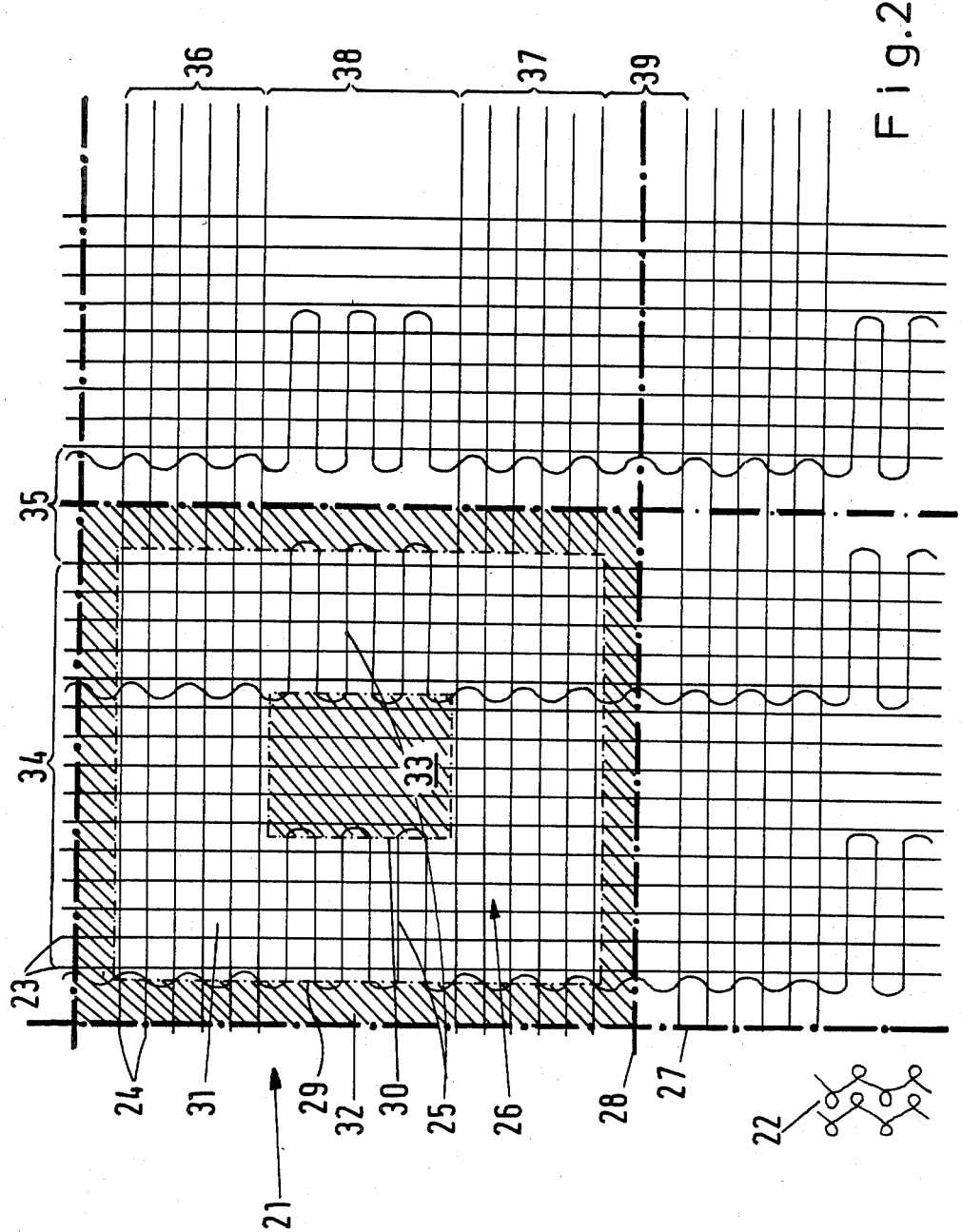
FIG. 2 is a plan view of a fabric having full, reinforcing, warp threads (at the useful areas) and other, reinforcing threads laid as partial weft threads.

In the embodiment of FIG. 2 the fabric panel comprises a ground stitch 22 in the form of a tricot stitch. The reinforcement threads comprise warp threads 23, full weft threads 24 and partial weft inlay threads 25. In the rectangularly shaped sector 26 which is delineated by dotted lines 27 and 28, there is found a useful sector 31 having an outside boundary formed by dotted (later separation) line 29 and an inside boundary formed by dotted (later separation) line 30. The warp inlay threads 23 are laid down the entire length of useful sector 31, that is to say, across the entire segment 34, while intermediate segment 35 is free thereof. The weft inlaid threads 24 are laid across the entire panel width during the working of the first sector 36 of the usage sector 31 and in the working of the last segment 37 of usage sector 31. These threads are inserted by a magazine as described previously. The intermediate segment 38 and the subsequent sector 39 have no full weft threads. In the intermediate sector 38 however, partial weft threads 25 are so laid that they cover the area from the cut-out edge 29 to the cut-out edge 30. These partial weft threads are laid in the panel travel direction in the other sectors 36, 37 and 39. The thus produced reinforcement inlay thus has the form of a rectangular, annular plate. The partial weft threads 25 are laid across the relevant width of the fabric panel in a similar manner by means of a single guide bar (not shown) used for these partial weft threads.

Figure 3:
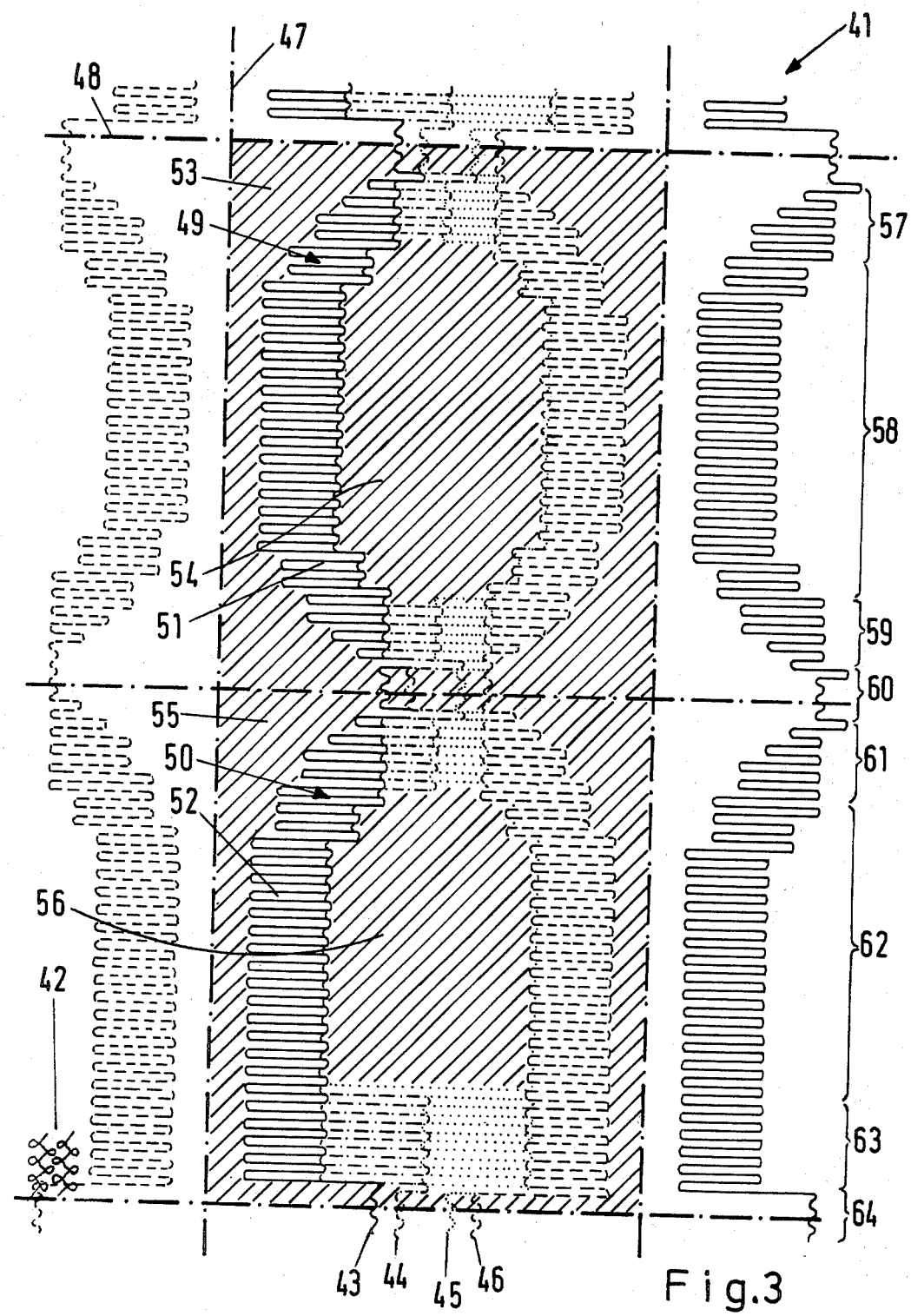
FIG. 3 is a plan view of a fabric having four reinforcing threads laid as partial weft threads to form an annular pattern.

In the fabric panel of FIG. 3 the ground stitch 42 can be of any desired form, that is to say, in place of the indicated tricot stitch 42, there may equally be used a pillar stitch, a two and one stitch or the like. The reinforcement threads comprise only partial weft inlay threads 43, 44 and 45, 46, which are laid by different guide bars. The dotted lines 47 and 48 designate the edges of the rectangular surfaces 49 and 50 which provide, in the panel direction, two differentiatiable useful sectors 51 and 52. In consequence thereof there are also four differentiable waste sectors 53, 54, 55 and 56, which are shown in diagonal shading. Later the unshaded usage sectors 51 and 52 are stamped out. The separation line is not indicated in this embodiment but will be understood to run around the inside and outside periphery of the useful sectors.

In the first worked sector 57, all four partial weft threads 43 thru 46 are in operation. They are shogged transversely in alternate directions from stitch to stitch. This may be accomplished with four separate guide bars, if desired. The locus of the shogging for threads 44 and 45 remains the same throughout section 57, but threads 43 and 46 vary. These threads reciprocate over an ever increasing span, the outward reach increasing while the inner reach begins to migrate outwardly. In the next sector 58 only the outer threads 43 and 46 are laid as partial weft threads while the corresponding threads 44 and 45 are led down the corresponding inner edge of usage area 51. Threads 43 and 46 are shogged over a channel that moves outwardly, reaches a midpoint where their lateral motions are invariant, and enter a trailing section where the lateral motions reverse and tend toward convergence. There follows segment 59 in which all of the four partial weft threads 43 thru 46 are in operation. In this section the threads perform the same operations as in section 57 but in reverse order. In the next sector 60 all of the partial weft threads are led in panel direction without shogging.

In subsequent sector 61 all four threads 43, 44, 45 and 46 are in operation, again. This operation is the same as was performed in section 57. Subsequently in sector 62, only the two outer threads 43 and 46 are laid as weft threads. The operations in this section are similar to that of section 58 except that the operations of section 62 terminate early. In sector 63 all four threads are operational and shog with approximately equal displacements. In sector 64 all of the threads are led in the panel direction. In order to obtain a desired carved form the subsequent weft thread inserts are displaced sidewards mutually with respect to each other.

When the desired molded item has a curved shape, it is recommended that the reinforcement threads be laid into the useful area as partial weft threads during the working thereof; whereby at least some of the mutually succeeding partial weft thread inlays are displaced laterally with respect to each other. Thus, warp inlays can be laid in the shifting motion corresponding to the displacement of the partial weft threads so that the reinforcement threads cross in the entire channeled area.

Figure 4:
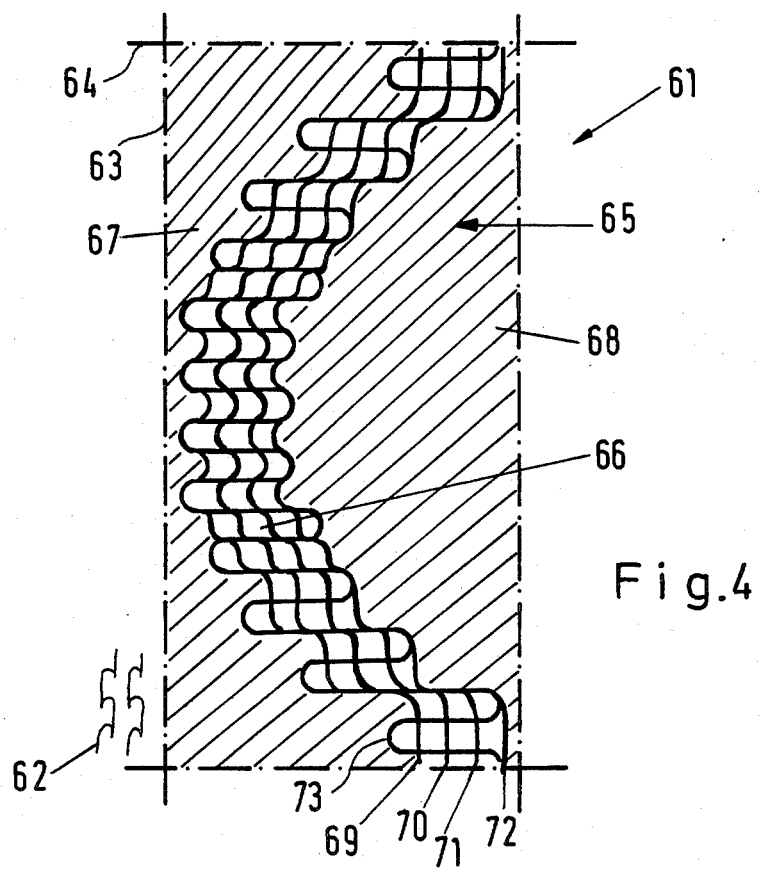
FIG. 4 is a plan view of a fabric having reinforcing, partial weft threads laid along a curved channel together with reinforcing warp threads laid to follow the same channel.

In the embodiment shown in FIG. 4 there is provided a fabric panel 61 with a ground stitch 62 in the form of a pillar stitch. Within the dotted lines 63 and 64, designating a rectangle 65, there is provided a use area 66 and two waste areas 67 and 68 shown in diagonal shading. The later separation cut to remove the reinforcement inlay runs substantially between the useful sector 66 and the remaining sectors 67 and 68.

In this embodiment the reinforcement threads are provided by four warp inlay threads 69, 70, 71 and 72 as well as partial weft thread inlays 73. The partial weft thread 73 is so led that succeeding segments are displaced laterally from each other so that in the final result a carved form is provided to the ultimately obtained inlay. The warp inlay thread 69 to 72 are subjected to deflecting motion in such a manner that they follow the displacement of partial weft thread 73. The tension which operates upon the warp threads 69–72 in the goods themselves ensures that they are not as sinuous as shown in the drawing but less sinuous. Also in this embodiment different types of ground stitch may be utilized.

A finished product will have been saturated or covered with an embedding material or other further treatment such as pressing, polishing, or the like of the thus provided product. The finished product may be used as a gasket material, such as gasket rings, head gaskets or the like and other items.

It is to be appreciated that various modifications may be implemented with respect to the above described preferred embodiments. It is possible to provide different thread densities. This may be achieved where the useful segments are formed next to each other in the textile panel, the reinforcement threads being provided as full weft inlays only during the working of the useful sectors. Another possibility exists therein in providing the reinforcement threads as warp threads only across the breadth of the useful sector, where the useful sectors follow each other in the fabric panel.

Yet another possibility exists whereby the useful sectors are provided both adjacent to each other and following each other in the textile. In this situation, panel reinforcement threads in the form of partial weft threads, can be laid into the useful sectors during the working thereof; but between the useful sectors the reinforcement threads are led in the direction of the travel of the panel. This possibility can also be combined with other measures. For example, during the working of the first and last useful subsectors, reinforcement threads are provided as full weft inlays and in between the subsectors are laid-in as partial weft threads. In this manner it is possible to provide rectangular useful sectors with a surrounding rectangular waste area.

Obviously, many modifications and variations of the present invention are possible in light of the above teachings. It is, therefore, to be understood that within the scope of the appended claims, the invention may be practiced otherwise than as specifically described.

What is claimed is:

1. A process for the formation of articles such as gaskets from embedding material and a flat textile panel, said panel being divisible into useful areas corresponding to said articles and areas outside said useful areas comprising the steps of:
   locating said reinforcement threads in the areas of the textile panel corresponding to the useful areas in greater thickness and density than in the majority of the areas of the panel remaining outside the useful areas;
   producing said textile panel from a ground pattern having the reinforcement threads inlaid thereinto;
   separating the useful areas from said textile panel; and
   embedding said embedding material into the appropriate useful areas corresponding to said articles.

2. The process according to claim 1 wherein the proportion of the reinforcement threads located outside the useful area is less than 10% of the total reinforcement thread consumption.

3. The process in accordance with claim 2 wherein the proportion of the reinforcement thread located outside the useful area is less than 5%.

4. The process in accordance with claim 1 wherein the reinforcement thread is a technical thread selected from the group consisting of threads made of carbon, glass, quartz, fluorinated polymers, special purpose polyamides, and metals.

5. The process according to claim 4 wherein the fluorinated polymer is "TEFLON", the special purpose polyamide is "KEVLAR", and the metals are selected from the group consisting of steel, silver, and gold.

6. A process in accordance with claim 1 wherein the material utilized as a reinforcement threads is stiffer and/or more breakable than the material used for the ground pattern.

7. The process in accordance with claim 1 wherein the reinforcement threads are laid in a laying pattern selected from the group consisting of weft inlay, partial weft inlay, warp inlay and combinations thereof which provide a greater density to the useful areas of the panel than in the rest thereof.

8. The process in accordance with claim 7 where in the formation of useful areas said reinforcement threads are placed adjacent to each other in the textile panel as full weft inlay threads only during the production of the useful areas of the textile panel.

9. The process in accordance with claim 7 where in the formation of useful areas succeeding each other in the textile panels, said reinforcement threads are supplied as warp inlay threads, said supplying as warp inlay threads occurring only across the breadth of the useful areas.

10. The process in accordance with claim 7 wherein said useful areas are produced repetitively to form both adjacent and succeeding segments in the textile panel, the producing of said textile panel including:
laying said reinforcement threads in the form of partial weft inlay threads during the working of the useful areas, between said useful areas said reinforcement threads being laid in in the direction of travel of the textile panel.

11. The process in accordance with claim 10 wherein the producing of said panel during the beginning and during the ending of fabrication of said useful areas includes the step of:
laying the reinforcement threads of the useful areas as full weft inlay threads, between said useful areas said reinforcement threads being laid as partial weft threads.

12. The process in accordance with claim 10 wherein the producing of said panel during the beginning and during the ending of fabrication of said useful areas includes the step of:
laying the reinforcement threads as partial weft threads, at least one mutually succeeding pair of said partial weft thread being laterally displaced with respect to each other.

13. The process in accordance with claim 12 wherein the reinforcing threads are laid as warp threads following a deflecting path corresponding to the displacement of said partial weft threads.

14. The process in accordance with claim 13 wherein the reinforcement threads are laid in the form of a plurality of complementing partial weft threads, said reinforcing threads forming a pattern in said useful area having a useful width which varies longitudinally, said reinforcing threads being laid as partial weft threads in the widest useful portions of said pattern, less than all of said reinforcing threads being laid as partial weft threads in a narrower useful portion of said pattern.

15. A process for the formation of articles such as gaskets from embedding material and a flat textile panel, said panel being divisible into useful areas corresponding to said articles and areas outside said useful areas, comprising the steps of:
locating said reinforcement threads in the areas of the textile panel corresponding to the useful areas in greater thickness and density than in the majority of the areas of the panel remaining outside the useful areas;
producing said textile panel from a ground pattern having the reinforcement threads inlaid thereinto;
embedding said embedding material into the appropriate useful areas corresponding to said articles and separating the useful areas from said textile panel to form said articles.

16. The process according to claim 15 wherein the proportion of the reinforcement threads located outside the useful area is less than 10% of the total reinforcement thread consumption.

17. The process in accordance with claim 16 wherein the proportion of the reinforcement thread located outside the useful area is less than 5%.

18. The process in accordance with claim 15 wherein the reinforcement thread is a technical thread selected from the group consisting of threads made of carbon, glass, quartz, fluorinated polymers, special purpose polyamides and metals.

19. The process according to claim 18 wherein the fluorinated polymer is "TEFLON", the special purpose polyamide is "KEVLAR", and the metals are selected from the group consisting of steel, silver and gold.

20. A process in accordance with claim 15 wherein the material utilized as a reinforcement thread is stiffer and/or more breakable than the material used for the ground pattern.

21. The process in accordance with claim 15 wherein the reinforcement threads are laid in a laying pattern selected from the group consisting of weft inlay, partial weft inlay, warp inlay and combinations thereof which provide a greater density to the useful areas of the panel than in the rest thereof.

22. The process in accordance with claim 21 where in the formation of useful areas said reinforcement threads are placed adjacent to each other in the textile panel as full weft inlay threads only during the production of the useful area of the textile panel.

23. The process in accordance with claim 21 where in the formation of the useful areas succeeding each other in the textile panels, said reinforcement threads are supplied as warp inlay threads, said supplying as warp inlay threads occurring only across the breadth of the useful areas.

24. The process in accordance with claim 21 wherein said useful areas are produced repetitively to form both adjacent and succeeding segments in the textile panel, the producing of said textile panel including:
laying said reinforcement threads in the form of partial weft inlay threads during the working of the useful areas, between said useful areas said reinforcement threads being laid in the direction of travel of the textile panel.

25. The process in accordance with claim 24 wherein the producing of said panel during the beginning and during the ending of fabrication of said useful areas includes the steps of:
laying the reinforcement threads of the useful areas as full weft inlay threads, between said useful areas said reinforcement threads being laid as partial weft threads.

26. The purpose in accordance with claim 24 wherein the producing of said panel during the beginning and during the ending of fabrication of said useful areas includes the step of:
laying the reinforcement threads as partial weft threads, at least one mutually succeeding pair of said partial weft thread being laterally displaced with respect to each other.

27. The process in accordance with claim 26 wherein the reinforcing threads are laid as warp threads following a deflecting path corresponding to the displacement of said partial weft threads.

28. The process in accordance with claim 27 wherein the reinforcement threads are laid in the form of a plurality of complementing partial weft threads, said reinforcing threads forming a pattern in said useful area having a useful width which varies longitudinally, said reinforcing threads being laid as partial weft threads in the widest portions of said pattern, less than all of said reinforcing threads being laid as partial weft threads in a narrower useful portion of said pattern.

* * * * *